US011240854B2

(12) United States Patent
Ebrahimi Afrouzi et al.

(10) Patent No.: US 11,240,854 B2
(45) Date of Patent: Feb. 1, 2022

(54) METHODS AND SYSTEMS FOR PAIRING MOBILE ROBOTIC DEVICE DOCKING STATIONS WITH A WIRELESS ROUTER AND CLOUD SERVICE

(71) Applicants: Ali Ebrahimi Afrouzi, San Jose, CA (US); Chin Pang Alfred Kwan, Toronto (CA); Andrew Francis Fitzgerald, Hamilton (CA)

(72) Inventors: Ali Ebrahimi Afrouzi, San Jose, CA (US); Chin Pang Alfred Kwan, Toronto (CA); Andrew Francis Fitzgerald, Hamilton (CA)

(73) Assignee: AI Incorporated, Toronto (CA)

( * ) Notice: Subject to any disclaimer, the term of this patent is extended or adjusted under 35 U.S.C. 154(b) by 176 days.

(21) Appl. No.: 16/109,617

(22) Filed: Aug. 22, 2018

(65) Prior Publication Data
US 2019/0069330 A1 Feb. 28, 2019

Related U.S. Application Data

(60) Provisional application No. 62/548,784, filed on Aug. 22, 2017, provisional application No. 62/667,977, filed on May 7, 2018.

(51) Int. Cl.
| | |
|---|---|
| *H04W 76/11* | (2018.01) |
| *H04L 29/06* | (2006.01) |
| *G06K 19/06* | (2006.01) |
| *H04W 12/50* | (2021.01) |

(Continued)

(52) U.S. Cl.
CPC ....... *H04W 76/11* (2018.02); *G06K 19/06037* (2013.01); *H04L 63/083* (2013.01); *H04W 12/50* (2021.01); *H04W 12/77* (2021.01); *H04W 84/12* (2013.01)

(58) Field of Classification Search
CPC .............. H04W 76/11; H04W 12/003; H04W 12/00522; H04W 84/12; H04W 76/14; H04W 84/18; G06K 19/06037; H04L 63/083

See application file for complete search history.

(56) References Cited

U.S. PATENT DOCUMENTS

| | | |
|---|---|---|
| 6,845,297 B2 | 1/2005 | Allard |
| 8,380,349 B1 | 2/2013 | Hickman et al. |
| 9,052,861 B1 * | 6/2015 | Pizot ................... H04L 63/0281 |

(Continued)

*Primary Examiner* — Hoang-Chuong Q Vu (57) ABSTRACT

A method for adding a robotic device to a first Wi-Fi network using a communication device, is disclosed, including generating an instruction to add the robotic device to the first Wi-Fi network using an application of the communication device connected to a first Wi-Fi network; extracting Wi-Fi access point's SSID and Wi-Fi password for the first Wi-Fi network by the application of the communication device; instructing the robotic device to enter into pairing mode; disconnecting the communication device from the first Wi-Fi network and connecting the communication device to a second Wi-Fi network of the robotic device using the application of the communication device; transferring the Wi-Fi access point's SSID and the Wi-Fi password for the first Wi-Fi network to the robotic device using the application of the communication device; and connecting the communication device to the first Wi-Fi network.

7 Claims, 6 Drawing Sheets

(51) Int. Cl.
*H04W 12/77* (2021.01)
*H04W 84/12* (2009.01)

(56) References Cited

U.S. PATENT DOCUMENTS

| | | | | |
|---|---|---|---|---|
| 9,486,924 | B2 | 11/2016 | Dubrovsky et al. | |
| 9,690,746 | B1* | 6/2017 | Hosea | H04L 41/0853 |
| 2009/0248200 | A1 | 10/2009 | Root | |
| 2012/0265913 | A1* | 10/2012 | Suumaki | H04W 76/14 |
| | | | | 710/303 |
| 2014/0196140 | A1* | 7/2014 | Gong | H04L 67/104 |
| | | | | 726/10 |
| 2014/0369232 | A1* | 12/2014 | Kim | H04W 8/005 |
| | | | | 370/254 |
| 2015/0016417 | A1* | 1/2015 | Dees | H04W 88/08 |
| | | | | 370/331 |
| 2015/0097689 | A1* | 4/2015 | Logue | H04W 4/38 |
| | | | | 340/632 |
| 2016/0269394 | A1* | 9/2016 | Zhong | H04W 48/14 |
| 2017/0142086 | A1* | 5/2017 | Chen | H04W 12/0023 |
| 2018/0098676 | A1* | 4/2018 | Ryu | A47L 9/2805 |
| 2018/0176771 | A1* | 6/2018 | Yang | H04L 9/0819 |
| 2018/0225444 | A1* | 8/2018 | Frenz | H04L 9/0841 |
| 2018/0249515 | A1* | 8/2018 | Li | H04W 48/16 |
| 2018/0288817 | A1* | 10/2018 | Windorfer | H04W 76/11 |
| 2018/0352976 | A1* | 12/2018 | Shen | H04L 67/306 |
| 2018/0368646 | A1* | 12/2018 | Buehler | A47L 11/24 |
| 2019/0167059 | A1* | 6/2019 | Brown | G05D 1/0033 |
| 2019/0183310 | A1* | 6/2019 | Herron | H04N 5/247 |
| 2019/0190915 | A1* | 6/2019 | Barrera | H04L 67/34 |
| 2019/0234786 | A1* | 8/2019 | Klicpera | G01F 15/063 |
| 2020/0102074 | A1* | 4/2020 | Kinsley | B64C 39/024 |
| 2021/0235516 | A1* | 7/2021 | Wang | H04L 12/2869 |

\* cited by examiner

METHODS AND SYSTEMS FOR PAIRING MOBILE ROBOTIC DEVICE DOCKING STATIONS WITH A WIRELESS ROUTER AND CLOUD SERVICE

CROSS-REFERENCE TO RELATED APPLICATIONS

This application claims the benefit of provisional patent application Nos. 62/548,784 and 62/667,977. In this patent, certain U.S. patents, U.S. patent applications, or other materials (e.g., articles) have been incorporated by reference. Specifically, U.S. application Ser. Nos. 16/051,328, 62/539,414, 62/624,891, 62/661,802, 15/949,708, and 15/272,752 are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE INVENTION

This present invention relates to robotic devices generally and, more particularly, to pairing docking stations of robotic devices with a wireless router and cloud service.

BACKGROUND

Robotic devices are becoming increasingly common in consumer homes and commercial spaces. These may include robotic vacuums, robotic mops, robotic lawn mowers among other devices which move autonomously through areas for the purpose of performing work. A method to wirelessly and remotely communicate with these robotic devices is essential as they become increasingly used in order to provide more oversight and control over the devices. Several methods for communicating with robotic devices have traditionally been used; however, the methods of communication are limited by either the status of the robotic device or by the position of the communication device, the dock, or the robotic device.

For example, wireless and remote communication with a robotic device through the use of a communication device has been proposed (see, e.g., U.S. Patent App. No. 2009/0248200 and U.S. Pat. No. 8,380,349). In this method, the mobile device sends information to a cloud service, which then sends the information to a home Wi-Fi router to transmit the information to the robotic device. This allows the user to communicate with the robotic device remotely; however, information cannot be sent to or retrieved by the robotic device and stored for future processing if the robotic device is engaging in a cleaning cycle, recharging, or operating out of the wireless range. The user must then inconveniently wait until, for example, the robot is no longer engaged in a duty cycle, at which time the user may forget to issue the commands or may be preoccupied. In other cases, commands may only be sent in real-time (see, e.g., U.S. Pat. No. 6,845,297). It is preferable that the user be able to issue commands regardless of the robot's status such that the robot may store and queue commands for future processing.

Another method for communication with robotic devices is the the use of radio frequency (RF) (see, e.g., U.S. Pat. No. 9,486,924). In this case, the communication device, docking station, and robot may all communicate with one another using RF. Unlike the preceding described method, this method is capable of receiving and storing information for future processing; however, the method requires the robot and dock to be within the RF range to be able to receive information sent from the communication device and is thus limited by a geographic proximity requirement. This is inconvenient for the user as the user must be within the vicinity of the robot and dock to issue commands and cannot do so remotely.

Embodiments described herein disclose systems and methods for communicating with a robotic device that are not limited by the status of the robot or by the position of the communication device, dock, or robot.

SUMMARY OF INVENTION

The following presents a simplified summary of some embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented below.

Embodiments disclosed herein include, for example, a method for adding a robotic device to a Wi-Fi network using a communication device, comprising generating an instruction to add the robotic device to the Wi-Fi network using an application of the communication device connected to the Wi-Fi network, the application comprising a graphical user interface; generating a QR barcode using the application of the communication device, the QR barcode comprising at least an SSID of the Wi-Fi network and Wi-Fi password; capturing an image of the QR barcode using an image sensor of the robotic device; parsing the QR barcode using image recognition software of the robotic device to extrapolate at least the Wi-Fi access point's SSID and Wi-Fi password; and using the Wi-Fi access point's SSID and Wi-Fi password to connect the robotic device to the Wi-Fi network.

In another embodiment, a method for adding a robotic device to a first Wi-Fi network using a communication device, is disclosed, comprising generating an instruction to add the robotic device to the first Wi-Fi network using an application of the communication device connected to a first Wi-Fi network, the application comprising a graphical user interface; extracting Wi-Fi access point's SSID and Wi-Fi password for the first Wi-Fi network by the application of the communication device; instructing the robotic device to enter into pairing mode, wherein entering into pairing mode enables a Wi-Fi network card of the robotic device to establish a wireless connection with the communication device; disconnecting the communication device from the first Wi-Fi network and connecting the communication device to a second Wi-Fi network of the robotic device using the application of the communication device; transferring the Wi-Fi access point's SSID and the Wi-Fi password for the first Wi-Fi network to the robotic device using the application of the communication device, wherein the robotic device uses the Wi-Fi access point's SSID and Wi-Fi password to connect to the first Wi-Fi network; and connecting the communication device to the first Wi-Fi network.

In another embodiment, a method is disclosed for adding a robotic device to a Wi-Fi network using a communication device, comprising receiving Wi-Fi access point's SSID and Wi-Fi password for the Wi-Fi network by an application of the communication device, the application comprising a graphical user interface; and transferring the Wi-Fi access point's SSID and the Wi-Fi password for the Wi-Fi network to the robotic device using the application of the communication device using a wireless communication channel, wherein the robotic device uses the Wi-Fi access point's SSID and the Wi-Fi password to connect to the Wi-Fi network.

These and other features and advantages of the present invention will be apparent to those skilled in the art in view of the described embodiments with reference to the drawings, as provided below.

BRIEF DESCRIPTION OF THE DRAWINGS

Non-limiting and non-exhaustive features of the present invention are described and depicted with reference to the following figures, wherein like reference numerals refer to like parts throughout the various figures.

DETAILED DESCRIPTION OF THE INVENTION

The present techniques will now be described in detail with reference to a few embodiments thereof as illustrated in the accompanying drawings. In the following description, numerous specific details are set forth in order to provide a thorough understanding of the present techniques. It will be apparent, however, to one skilled in the art, that the present techniques may be practiced without some or all of these specific details. In other instances, well known process steps and/or structures have not been described in detail in order to not unnecessarily obscure the present techniques.

Various embodiments are described herein below, including methods and systems. It should be kept in mind that the invention might also cover articles of manufacture that include a computer-readable medium on which computer-readable instructions for carrying out various embodiments of the inventive techniques are stored. The computer-readable medium may include semiconductor, magnetic, opto-magnetic, optical, or other forms of computer-readable medium for storing computer-readable code. Further, embodiments may also include apparatuses for practicing embodiments of the invention. Such apparatus may include circuits, dedicated and/or programmable, to carry out tasks pertaining to embodiments described herein.

As understood herein, the term "robot" or "robotic device" may be defined generally to include one or more autonomous or semi-autonomous devices having communication, mobility, and/or processing elements. For example, a robot or robotic device may comprise a casing or shell, a chassis including a set of wheels, a motor to drive wheels, a receiver that acquires signals transmitted from, for example, a transmitting beacon, a processor, and/or controller that processes and/or controls motor and other robotic autonomous or cleaning operations, network or wireless communications, power management, etc., and one or more clock or synchronizing devices.

In embodiments, a docking station of a robotic device may be paired with a Wi-Fi network and robotic device cloud services using a QR barcode generated by a mobile device application connected to the same Wi-Fi network and cloud services. In some embodiments, a mobile device is connected to a Wi-Fi network that is also accessible to a docking station corresponding to a robotic device. In some embodiments, a smart phone, computer, tablet, or any device that has a Wi-Fi module, including stationary devices, may be used to connect to a Wi-Fi network that is also accessible to a docking station corresponding to a robotic device. Once connected, the mobile device application with connectivity to the robotic device cloud service is logged into using unique robotic device cloud service login information. In some embodiments, the mobile device application is designed to run on a mobile, stationary, and/or smart communication device and may be downloaded onto the device through various means. In other embodiments, a web application accessible through a stationary, mobile, and/or smart communication device through a web browser and with connectivity to the robotic device cloud services may be used. In other embodiments, a software provided with the robotic device and docking station and with connectivity to the robotic device cloud services may be downloaded onto the mobile device. After logging in, the application is used to generate a QR barcode containing the Wi-Fi access point's SSID, Wi-Fi password (if applicable), and the cloud service login information for the particular robotic device. In some embodiments, the QR barcode may be provided as a sticker with the robotic device and may comprise the at least one cloud service login information corresponding to the robotic device. Using a button or other selection method on the robotic device or autonomously upon, for example, initial setup or detecting available networks, the robotic device enters a barcode scanning mode and the QR barcode displayed on the mobile device is scanned using an image sensor such as a CMOS camera installed on the robotic device. In some embodiments, other types of scanners may be used to scan the barcode, such as laser scanner, CCD reader, omni-directional barcode scanner, and the like. One or more processors of the robotic device use image recognition software to parse the QR barcode and extrapolate the Wi-Fi access point's SSID, Wi-Fi password, and cloud service login information for the particular robotic device. The information acquired by the robotic device is then shared by the robotic device with the corresponding docking station using an RF communication channel. In some embodiments, the robotic device and/or charging station may receive Wi-Fi network details and/or cloud service login information corresponding to the robotic device through other means, such as user input of network details and/or cloud service login information using a user interface of the robotic device. The docking station may connect to the wireless network and log into the robotic device cloud services. The docking station may then relay any information relating to the robotic device to the cloud service. The mobile device application, also having connectivity to the robotic device cloud services, can retrieve any information related to the particular robotic device. In the same way, the docking station may retrieve any information relayed to the robotic device cloud services from the mobile application and share it with the robotic device using an RF communication channel. In some embodiments, the docking station and robotic device may transfer information using other types of wireless communication channels, such as Wi-Fi. Other means of connecting the various components of the system are also possible, such as the use of Bluetooth.

In some embodiments, the robotic device may provide confirmation to a user and/or the charging station and/or the mobile device when QR barcode scanning is complete, using, for example, an audio or visual alarm or other signal, alerting the user and/or the charging station and/or the mobile device that the process has occurred. The robotic device shares acquired information with the docking station using an RF communication channel. In some embodiments, the robotic device and docking station are paired at the manufacturing or production stage of the robotic device and corresponding docking station. Once the docking station receives the information, the Wi-Fi access point's SSID and password can be used to establish a Wi-Fi network connection. Using the cloud service login information corresponding to the robotic device, the docking station is also able to connect to the robotic device cloud service. In this way, the dock is able to relay information corresponding to the robotic device directly to the robotic device cloud services. The mobile device application, also having connectivity to the robotic device cloud services, can then retrieve any information related to the particular robotic device. Such information may include the model or serial number of the robotic device or may include information such as cleaning time or movement path. In the same way, the docking station may also retrieve any information relayed to the robotic device cloud services from the mobile application. Scheduling information may also be sent to the robotic device as described in detail in U.S. patent application Ser. No. 16/051,328, 62/539,414, and 62/624,891 the entirety of which are hereby incorporated by reference.

In some embodiments, the robotic device and charging station may each be directly connected to the Wi-Fi router. For example, both the robotic device and charging station may have capabilities to scan the QR barcode and extract Wi-Fi details required to establish a connection with the router. In other embodiments, the robotic device may be directly connected to the Wi-Fi router and the charging station only connected to the robotic device via a wireless communication channel such as RF or Bluetooth. In other embodiments only the charging station or the robotic device may be connected to the Wi-Fi router. In some embodiments, the Wi-Fi router may not be connected with a cloud service and information may be transmitted between the mobile application and robotic device and/or charging station locally. In other embodiments, the robotic device and/or docking station may be connected to the mobile device application using wireless Bluetooth channel. A mobile device application may be used to recognize a Bluetooth card of the robotic device and/or docking station and to connect with the robotic device and/or docking station via Bluetooth.

Figure 1A:
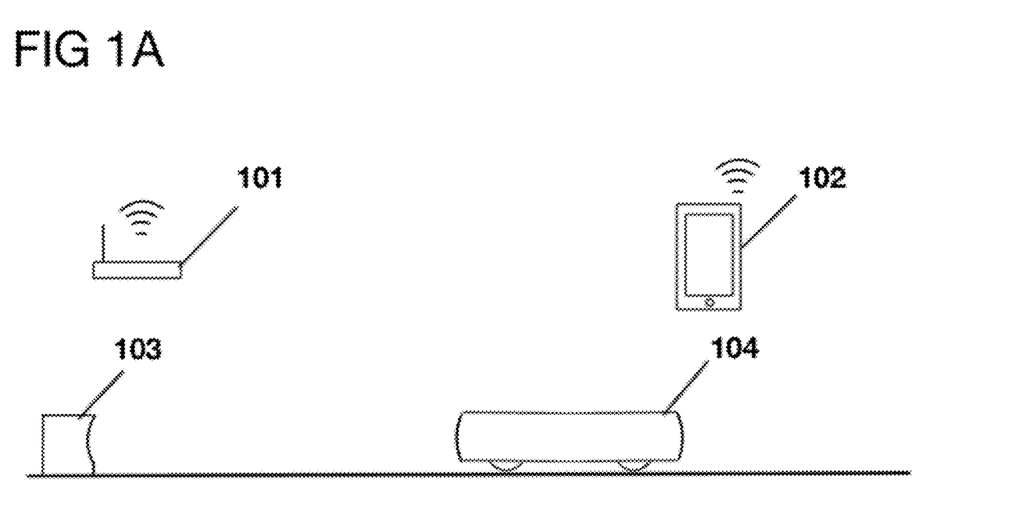
FIG. 1A illustrates a mobile device connected to a wireless network that is also accessible to a docking station corresponding to a robotic device, in accordance with some embodiments.
Figure 1B:
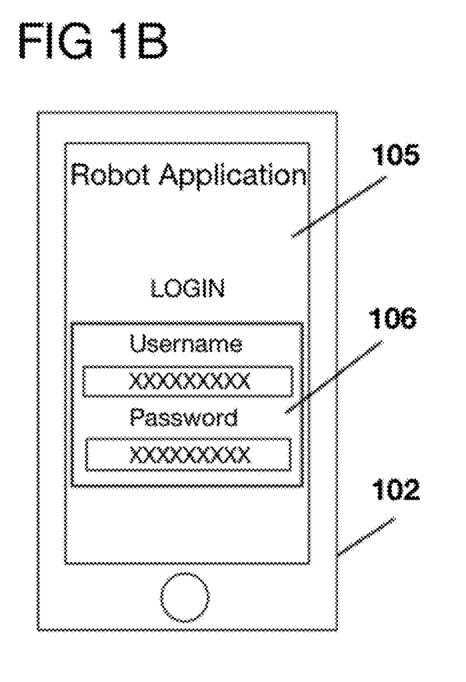
FIG. 1B illustrates how a user may log into a mobile device application designed specifically for use with a robotic device and having connectivity to a robotic device cloud service, in accordance with some embodiments.
Figure 1C:
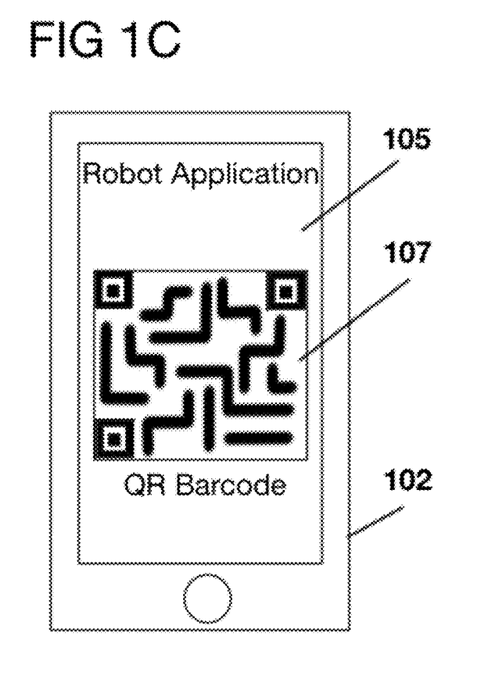
FIG. 1C illustrates a QR barcode generated by the mobile device application containing Wi-Fi access point's SSID, Wi-Fi password, and cloud service login information, in accordance with some embodiments.

FIGS. 1A, 1B, and 1C illustrate initial steps of the pairing method in accordance with some embodiments. Wireless router 101 is used to connect mobile device 102 to a Wi-Fi network, which is also accessible to docking station 103 corresponding to robotic device 104. Mobile device application 105 in FIG. 1B on mobile device 102 with access to robotic device cloud service is logged into using unique cloud service login information 106 corresponding to robotic device 104. Referring to FIG. 1C, in a third step mobile device application 105 generates QR barcode 107 containing the Wi-Fi access point's SSID, Wi-Fi password and cloud service login information corresponding to robotic device 104.

Figure 2:
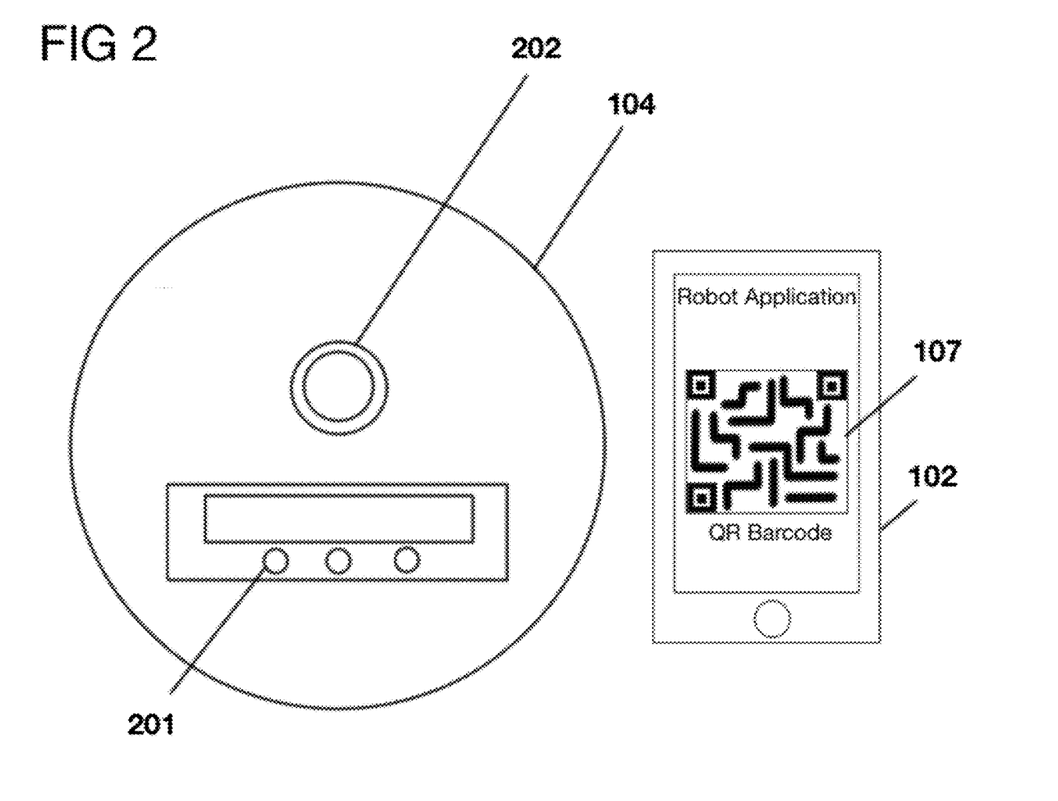
FIG. 2 illustrates the process of initiating barcode scanning mode on the robotic device for the purpose of scanning the generated QR barcode, in accordance with some embodiments.

Referring to FIG. 2, button 201 on the housing of robotic device 104 maybe pressed to enter barcode scanning mode. In other embodiments, robotic device 104 may enter barcode scanning mode autonomously upon, for example, initial setup or detecting available networks. Image Sensor such as a CMOS camera 202 is used to capture generated QR barcode 108 displayed on mobile device 102. In some embodiments, other types of scanners may be used to scan the barcode, such as laser scanner, CCD reader, omni-directional barcode scanner, and the like. The robotic device provides confirmation when QR barcode scanning is complete using, for example, an audio or visual alarm or other signal. In some embodiments, image recognition software may be used to parse QR barcode 108 and extrapolate the Wi-Fi access point's SSID and password as well as the cloud service login information corresponding to robotic device 104.

Figure 3:
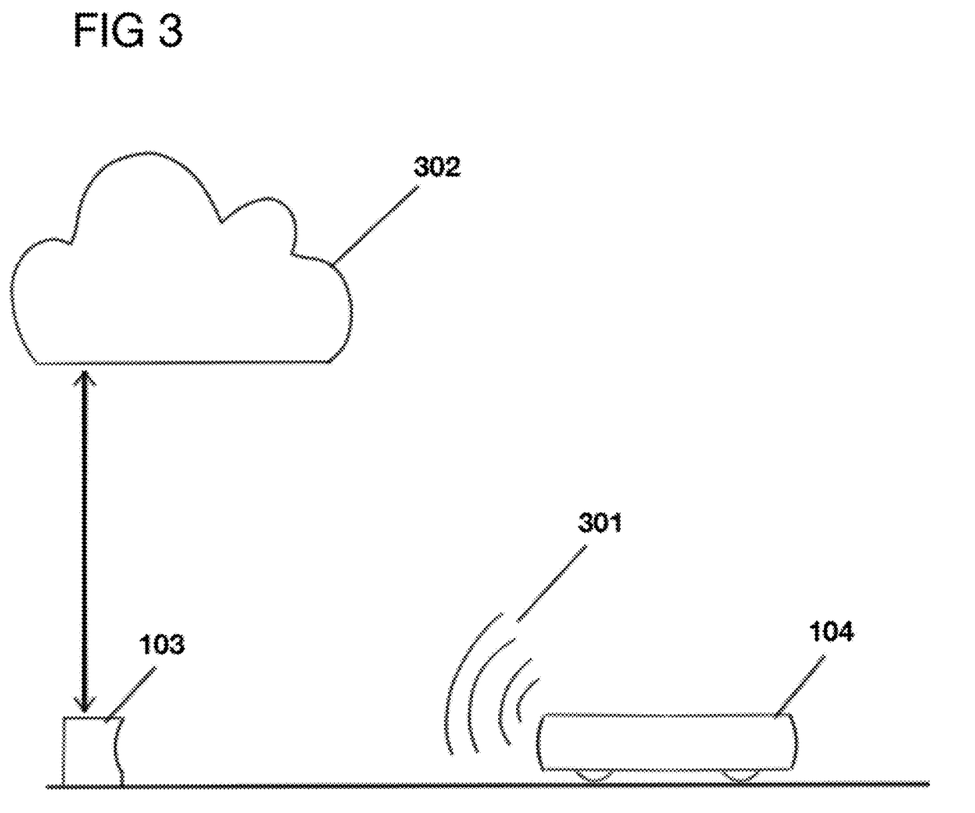
FIG. 3 illustrates the robotic device sharing Wi-Fi access point's SSID, Wi-Fi password and cloud service login information extrapolated from the scanned QR barcode with the docking station via RF, in accordance with some embodiments.

Referring to FIG. 3, information acquired by robotic device 104 is shared by robotic device 104 with docking station 103 using RF communication channel 301. Once docking station 103 receives the information, the Wi-Fi access point's SSID and password are used by the charging station to establish a Wi-Fi network connection. Using the cloud service login information corresponding to robotic device 104, docking station 103 connects to robotic device cloud service 302. Docking station 103 is then able to relay and retrieve information corresponding to robotic device 104 to and from robotic device cloud service 302.

Figure 4:
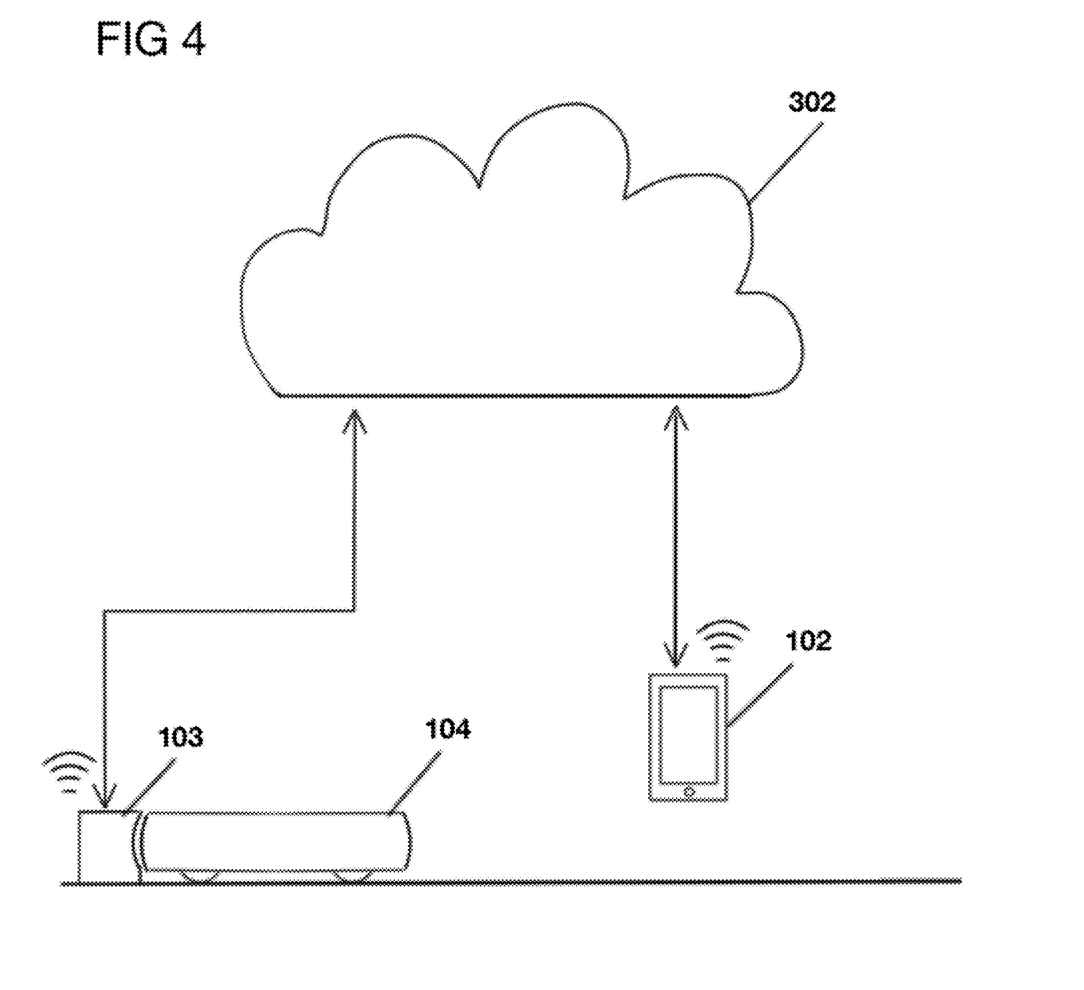
FIG. 4 illustrates the mobile device application and docking station corresponding to the robotic device connected with the robotic device cloud service, in accordance with some embodiments.

Referring to FIG. 4, mobile device 102 and docking station 103 have connectivity to robotic device cloud service 302 such that any information relayed to cloud service 302 by either mobile device 102 or docking station 103 can be retrieved by either mobile device 102 or docking station 103 as well, when connected to robotic device cloud service 302.

Figure 5:
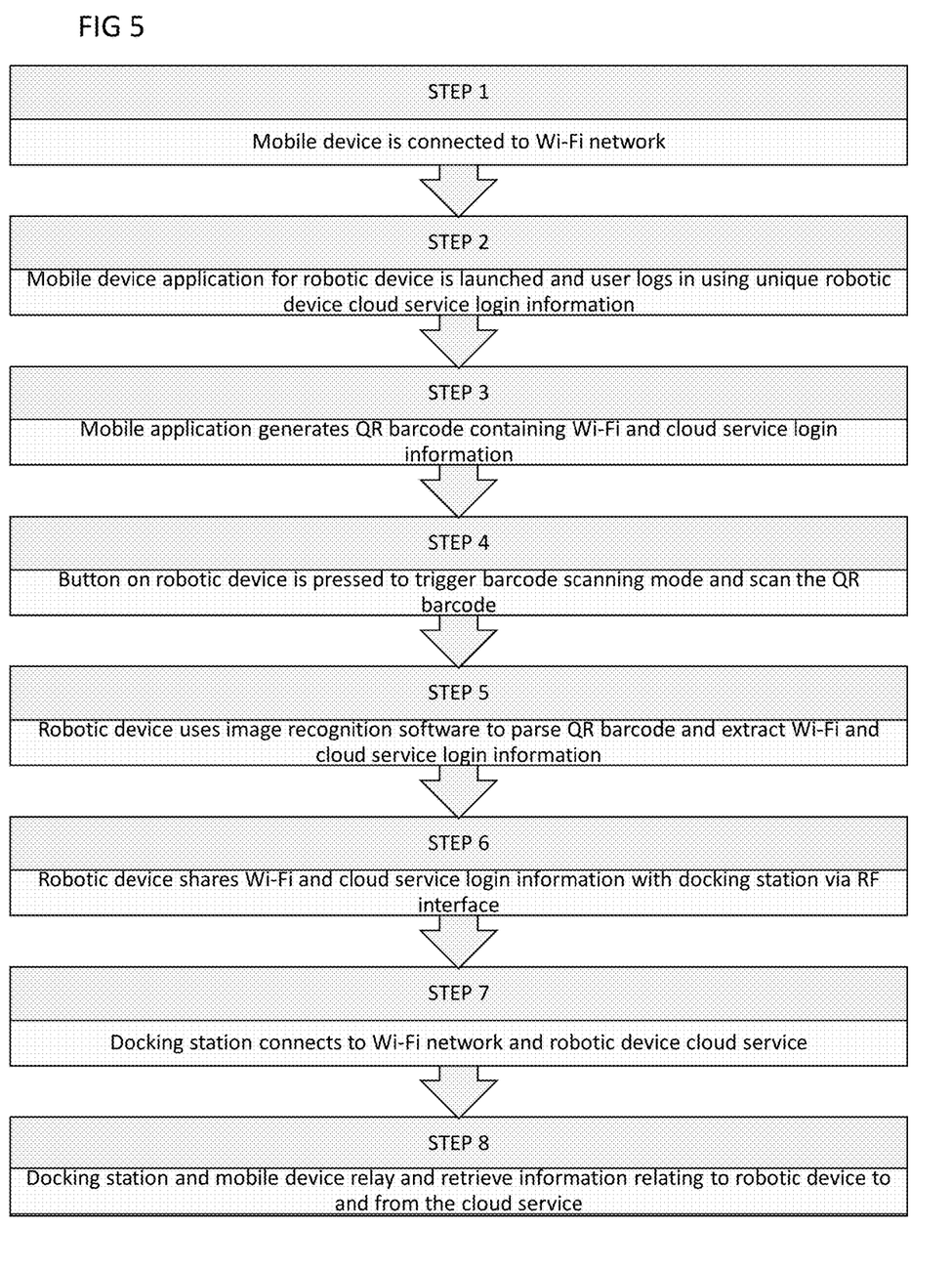
FIG. 5 illustrates a flowchart depicting the steps required to pair the robotic device to a mobile device application, in accordance with some embodiments.

Referring to FIG. 5, a flowchart depicting the steps required to pair the charging station of a robotic device to a Wi-Fi network and robotic device cloud service is illustrated in accordance with some embodiments. Starting from step 1, a mobile device is connected to a Wi-Fi network, which is also accessible to a docking station corresponding to a robotic device. Once connected, a mobile device application with connectivity to a robotic device cloud service is logged into using unique robotic device cloud service login information. After logging in, the application is used to generate a QR barcode containing the Wi-Fi access point's SSID, Wi-Fi password, and the cloud service login information corresponding to the particular robotic device. Using a button or other selection mechanism on the robotic device, the robotic device enters a barcode scanning mode and the QR barcode displayed on the mobile device is scanned using an image sensor installed on the robotic device. In other embodiments, the robotic device may enter barcode scanning mode autonomously upon, for example, initial setup or detecting available networks. Image recognition software is then used to parse the QR barcode and extrapolate the Wi-Fi access point's SSID, Wi-Fi password, and cloud service login information corresponding to the particular robotic device. In some embodiments, other types of scanners may be used to scan the barcode, such as laser scanner, CCD reader, omni-directional barcode scanner, and the like. The robotic device shares this information with the corresponding docking station via RF. The docking station is then able to connect to the wireless network and log into the robotic device cloud service. The docking station can then relay any information relating to the robotic device to the cloud service. The mobile device application, also having connectivity to the robotic device cloud service, can retrieve any information related to the particular robotic device. In the same way, the docking station may retrieve any information relayed to the robotic device cloud service from the mobile application.

In embodiments, a QR barcode sticker may be provided with the robotic device and/or corresponding charging station. The robotic device may enter syncing mode by pressing a button on a user interface of the robotic device or autonomously upon, for example, powering up for the first time or recognizing a wireless network or communication device. A communication device, such as a mobile device, laptop, tablet, remote and/or any device with a Wi-Fi and/or Bluetooth card, may use a communication device application to scan and parse the QR barcode. The communication device application may be a mobile application designed to run on a mobile, stationary, and/or smart communication device and may be downloaded onto the device through various means. In other embodiments, the communication device application may be a web application accessible through a stationary, mobile, and/or smart communication device through a web browser. In other embodiments, the communication device application may be a software provided with the robotic device and docking station and may be downloaded onto the communication device. The communication device application may be a QR barcode, which may comprise instructions to connect to the robotic device. In some embodiments, the instructions comprise disconnecting the communication device from a local router (if necessary), connecting the communication device to a Wi-Fi card of the robotic device, and when the connection is no longer necessary disconnecting the communication device from the Wi-Fi card of the robotic device and connecting it with the local router (if applicable). In other embodiments, the instructions may comprise connecting to the robotic device using a Bluetooth communication channel. Once the communication device establishes a connection with the robotic device, using an interface of the communication device application, information may be transmitted from the communication device to the robotic device and vice versa. In some embodiments, a similar approach may be used to sync the docking station with the communication device. In other embodiments, the instructions contained within the QR barcode may comprise syncing the charging station with the communication device before or after syncing the robotic device with the communication device. In some embodiments, the robotic device may be synced with the communication device and the docking station may be connected with the robotic device via wireless communication channel such as RF or Bluetooth. In other embodiments both the robotic device and the docking station are synced with the communication device. In another embodiment, the charging station may be synced with the communication device and the docking station may be connected with the robotic device via a wireless communication channel such as RF or Bluetooth. In some embodiments only the robotic device or the charging station is synced with the communication device.

Figure 6:
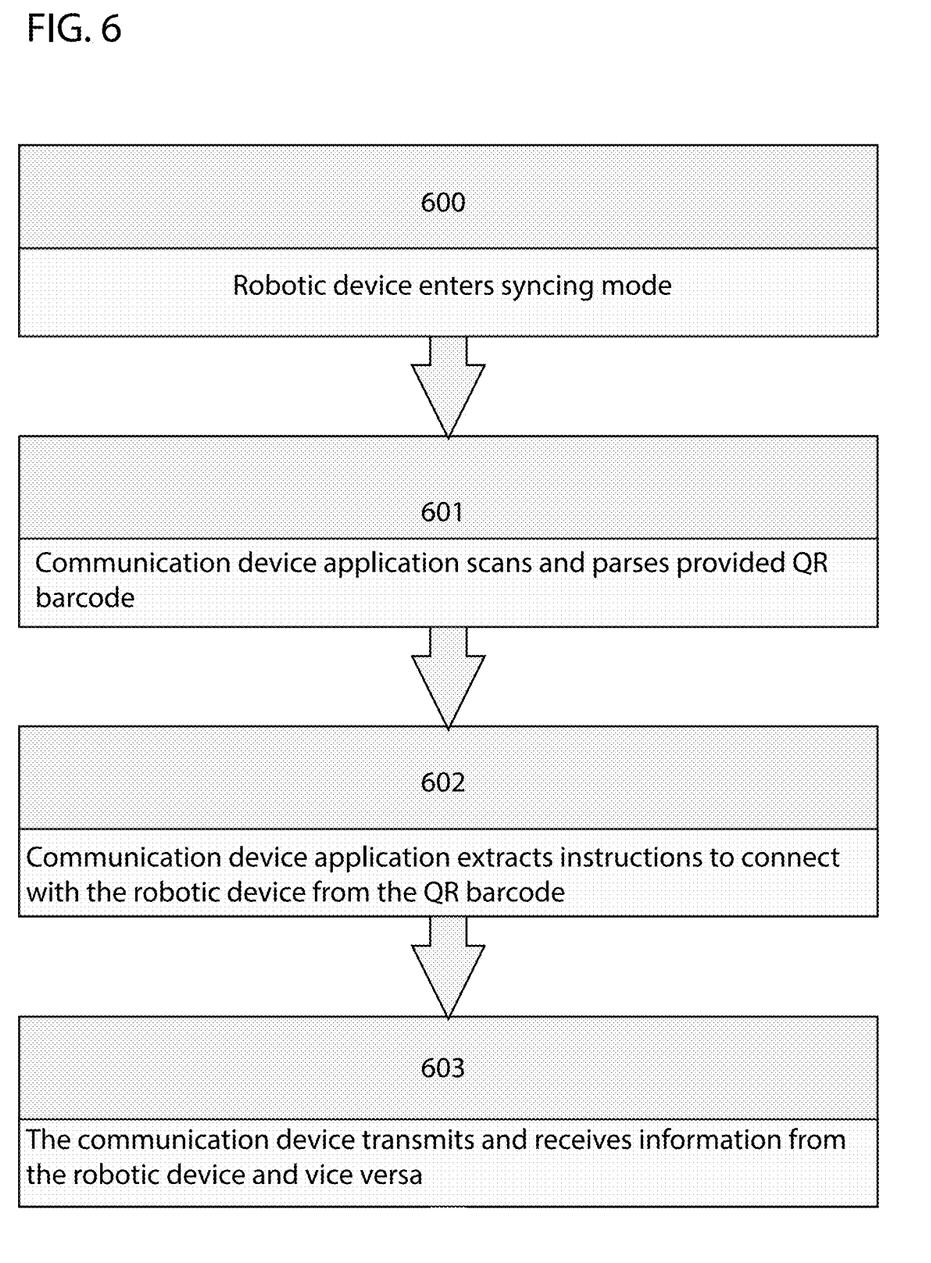
FIG. 6 illustrates a flowchart depicting the steps required to pair the robotic device to an application of a communication device, in accordance with some embodiments.

FIG. 6 illustrates a flowchart comprising the steps to one embodiment of pairing a communication device with a robotic device. At an initial step 600, the robotic device enters syncing mode. This may be done by activating a button on a user interface of the robotic device or autonomously upon, for example, powering up for the first time or recognizing a wireless network, wireless channel or communication device. In a next step 601, a communication device application scans and parses a QR barcode provided with the robotic device and corresponding docking station. The communication device application may be a mobile application designed to run on a mobile, stationary, and/or smart communication device and may be downloaded onto the device through various means. In other embodiments, the communication device application may be a web application accessible through a stationary, mobile, and/or smart communication device through a web browser. In other embodiments, the communication device application may be a software provided with the robotic device and docking station and may be downloaded onto the communication device. In a next step 602, the communication device application extracts instructions to connect with the robotic device from the QR barcode. In some embodiments, the connection may be Wi-Fi and/or Bluetooth. After establishing a connection, in step 603 the communication device and robotic device transmit and receive information to and from one another.

In some embodiments, information relayed from the communication device to the robotic device may comprise scheduling information. In some embodiments, scheduling information may comprise time of operation, area of operation, frequency of operation, type of operation, duration of operation and/or any other information relating to the operation and/or function of the robotic device. In some embodiments, a user may send scheduling information remotely using a communication device via Wi-Fi and is not required to be within the vicinity of the robotic device or dock. Further details of systems and methods for sending scheduling information to a robotic device may be found in U.S. patent application Ser. No. 16/051,328, 62/539,414, and 62/624,891, the entirety of which are hereby incorporated by reference.

In some embodiments, information may be configured to be transmitted to and received from robotic device cloud services via wireless Wide Area Network (WAN) connection, such as a mobile device carrier network. In cases where the data is transmitted and received using a WAN connection, the mobile device application may be used to send information and remotely monitor status information, such as the status of the robotic device or status of the working environment, such as room temperature. In embodiments, the transfer of information between the communication device application and cloud service and/or the docking station and cloud service and/or the docking station and robotic device may comprise additional steps of which are not depicted herein.

In other embodiments, information may be configured to be transmitted to and received from Wi-Fi router(s) via wireless Local Area Network (LAN) connection. In some embodiments, data may be transmitted and received using LAN connection such that no data is transmitted over WAN. In some embodiments, data may be transmitted and received using both a LAN and a WAN connection. In embodiments, the transfer of information between the application of the communication device and wireless router and/or the docking station and wireless router and/or the docking station and robotic device may comprise additional steps of which are not depicted herein or may be done through other communication channels, such as the use of Bluetooth.

In some embodiments, the docking station may be replaced by any other stationary device capable of transmitting and receiving information to and from the robotic device cloud service, and capable of transmitting and receiving information to and from the robotic device. In some embodiments, the robotic device may dock and/or charge at a separate device than the stationary device used for the transfer of information to and from the cloud service and/or the transfer of information to and from the robotic device. For example, a stationary device having memory, processor, Wi-Fi module and RF module may perform the same functions as those of the docking station described herein.

In some embodiments, a graphical user interface of the mobile device application such as that detailed in U.S. Patent App. Nos. 62/661,802, 15/949,708, and 15/272,752, the entirety of which are hereby incorporated by reference, may be used for retrieving and sending different types of information. Different types of information that may be transferred between the mobile device application and/or the docking station and/or the robotic device may comprise scheduling information, mapping information, navigation information, cleaning information, operation information or any other type of information that may be useful to the operator of mobile device, the robotic device, and/or the docking station. In some embodiments, the graphical user interface may be used to choose or adjust settings, functions, or information. For example, a user may adjust or correct a map of the environment and/or choose a desired function, such as mopping, of the robotic device and/or adjust a cleaning setting, such as brush speed, of the robotic device and transmit this information to the robotic device using the method described herein. Other communication devices such as a computer, tablet, smartphone, or a dedicated remote control may be used for transmitting and receiving information to and from the robotic device. The mobile device application may be, but does not have to be, the same or related to the mobile device application used in generating the QR barcode and connecting to the cloud service.

In some embodiments, the robotic device may be able to retrieve information directly from the cloud service and/or from the mobile device. In some embodiments, the charging station may be able to retrieve information directly from the mobile device.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

Accordingly, the foregoing descriptions of embodiments and techniques have been presented for purposes of illustration and description. They are not intended to be exhaustive and/or to limit the invention to the precise forms disclosed. Obviously, many modifications and variations are possible in light of the above teaching.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

We claim:

1. A method for adding a robotic device to a first Wi-Fi network using a communication device, comprising:
   generating an instruction to add the robotic device to the first Wi-Fi network using an application of the communication device connected to a first Wi-Fi network, the application comprising a graphical user interface;
   extracting Wi-Fi access point's SSID and Wi-Fi password for the first Wi-Fi network by the application of the communication device;
   instructing the robotic device to enter into pairing mode, wherein entering into pairing mode enables a Wi-Fi network card of the robotic device to establish a wireless connection with the communication device;
   disconnecting the communication device from the first Wi-Fi network and connecting the communication device to a second Wi-Fi network of the robotic device using the application of the communication device;
   transferring the Wi-Fi access point's SSID and the Wi-Fi password for the first Wi-Fi network to the robotic device using the application of the communication device, wherein the robotic device uses the Wi-Fi access point's SSID and Wi-Fi password to connect to the first Wi-Fi network; and
   connecting the communication device to the first Wi-Fi network, wherein:
   extracting the Wi-Fi access point's SSID and Wi-Fi password for the first Wi-Fi network comprises the application of the communication device receiving instructions from a QR barcode scanned using an imaging device of the robotic device and parsed by an image recognition software of the robotic device; and
   the QR barcode further provides instructions to the application of the communication device to disconnect the communication device from the first Wi-Fi network and connect the communication device to a second Wi-Fi network of the robotic device, transfer the Wi-Fi access point's SSID and Wi-Fi password for the first Wi-Fi network to the robotic device, and connect the communication device back to the first Wi-Fi network after the transfer of information is complete.

2. The method of claim 1, wherein the application of the communication device is connected to a cloud service.

3. The method of claim 1, wherein the QR barcode further comprises login information for the cloud service corresponding to the robotic device; wherein the image recognition software is configured to further extrapolate the login information for the cloud service; and wherein the robotic device connects to the cloud service using the login information.

4. The method of claim 1 further comprising transferring and receiving information between the robotic device and a docking station using radio frequency, wherein the information comprises at least one of Wi-Fi access point's SSID, Wi-Fi password, and cloud service login information.

5. The method of claim 4 further comprising using the Wi-Fi access point's SSID and Wi-Fi password to connect the docking station to the Wi-Fi network and using the cloud service login information to connect the docking station to the cloud service.

6. The method of claim 1 further comprising transferring and receiving information between at least one of the application of the communication device and the robotic device, the application of the communication device and a docking station, and the robotic device and the docking station, using a cloud service.

7. The method of claim 1 further comprising transferring and receiving information between at least one of the application of the communication device and the robotic device, the application of the communication device and a docking station, and the robotic device and docking station, using a Wi-Fi router.

* * * * *